(12) United States Patent
Nakamura et al.

(10) Patent No.: US 6,486,234 B1
(45) Date of Patent: Nov. 26, 2002

(54) IMPACT MODIFIER, PROCESS FOR PRODUCTION, AND RESIN COMPOSITION CONTAINING THE SAME

(75) Inventors: Keiji Nakamura, Otake (JP); Masakazu Ito, Otake (JP); Akira Nakata, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/720,819

(22) PCT Filed: Jul. 14, 1999

(86) PCT No.: PCT/JP99/03786

§ 371 (c)(1),
(2), (4) Date: Jan. 12, 2001

(87) PCT Pub. No.: WO00/04092

PCT Pub. Date: Jan. 27, 2000

(30) Foreign Application Priority Data

Jul. 14, 1998 (JP) ............................................. 10-198882

(51) Int. Cl.⁷ ........................ C08L 51/04; C08F 265/06
(52) U.S. Cl. ........................ 523/201; 525/71; 525/79; 525/80; 525/85
(58) Field of Search ............................. 525/71, 79, 80, 525/85; 523/201

(56) References Cited

U.S. PATENT DOCUMENTS

| | | |
|---|---|---|
| 3,678,133 A | 7/1972 | Ryan |
| 4,224,419 A * | 9/1980 | Swoboda et al. |
| 5,889,113 A * | 3/1999 | Mori et al. ................... 525/71 |

FOREIGN PATENT DOCUMENTS

| | | |
|---|---|---|
| JP | 51-028117 | 8/1976 |
| JP | 52-033991 | 3/1977 |
| JP | 59-105012 | 6/1984 |
| JP | 59-108056 | 6/1984 |
| JP | 59-138257 | 8/1984 |
| JP | 63-122748 | 5/1988 |
| JP | 63-033764 | 7/1988 |
| JP | 63-270715 | 11/1988 |
| JP | 63-270716 | 11/1988 |
| JP | 04-146910 | 5/1992 |
| JP | 5-247312 | 9/1993 |
| JP | 08-012703 | 1/1996 |

* cited by examiner

*Primary Examiner*—Jeffrey Mullis
(74) *Attorney, Agent, or Firm*—Oblon, Spivak, McClelland, Maier & Neustadt, P.C.

(57) ABSTRACT

The present invention relates to an impact strength modifier capable of imparting both excellent weathering resistance and impact resistance, and to a resin composition comprising the impact strength modifier and a thermoplastic resin, particularly a rigid vinyl chloride resin. Since this impact strength modifier comprises, as a principal component, an acrylic rubber graft copolymer which is obtained by graft polymerization of a polyalkyl (meth)acrylate (A) rubber containing a plurality of acrylic rubber components composed of a specific monomer as a principal component, and a vinyl monomer (B), it is made possible to improve the impact resistance, particularly impact resistance at low temperatures, of the resin and to satisfactorily maintain the weathering resistance by adding a small amount of the impact strength modifier to the resin. This impact strength modifier is particularly suited for incorporation into a rigid vinyl chloride resin.

22 Claims, 2 Drawing Sheets

IMPACT MODIFIER, PROCESS FOR PRODUCTION, AND RESIN COMPOSITION CONTAINING THE SAME

TECHNICAL FIELD

The present invention relates to an impact strength modifier capable of imparting both excellent weathering resistance and impact resistance, and to a resin composition comprising the impact strength modifier and a thermoplastic resin, particularly a rigid vinyl chloride resin.

This application is based on a Japanese Patent Application No. Hei 10-198882 filed in Japan, the contents of which are incorporated herein by reference.

BACKGROUND ART

Thermoplastic resins, particularly vinyl chloride resins, are widely used resins, but have such drawbacks as poor impact resistance. To improve the impact resistance, various methods have been suggested.

For example, there has been suggested a method of using a mixture prepared by mixing an MBS resin, which is obtained by graft polymerization of a butadiene rubber polymer with methyl methacrylate, styrene or acrylonitrile, with a vinyl chloride resin. However, when using the MBS resin in combination with the vinyl chloride resin, the impact resistance is improved but the weathering resistance is lowered. Therefore, a molded article of the vinyl chloride resin incorporating the MBS resin has such the drawback that the impact resistance is drastically lowered when using it outdoors. It is considered that the weathering resistance is lowered by deterioration of a butadiene unit constituting the MBS resin due to ultraviolet light.

Thus, there has been suggested a method of providing a vinyl chloride resin with both weathering resistance and impact resistances by using, as an impact strength modifier, resins obtained by graft polymerization of a crosslinked alkyl (meth) acrylate rubber polymer comprising an alkyl (meth) acrylate and a crosslinking agent, and methyl methacrylate, styrene or acrylonitrile in Japanese Unexamined Patent Publication, First Publication No. Sho 51-28117. When using such an acrylic graft copolymer as the impact strength modifier, the resulting molded article is superior in weathering resistance and is less susceptible to lowering of the impact resistance. However, there is the problem that a large amount of the acrylic graft copolymer must be added to impart the impact resistance and properties which can provide impact strength, particularly properties which can provide impact strength at low temperatures, are poor as compared with the case of using the MBS resin as the impact strength modifier.

As the another method of improving the impact resistance of the thermoplastic resin, for example, a method of using a multi-layer composite interpolymer having a two-mode distribution, comprising an elastomer inner phase and a rigid non-elastomer outer phase is suggested in Japanese Unexamined Patent Publication, First Publication No. Sho 63-270715 and Japanese Unexamined Patent Publication, First Publication No. Sho 63-270716.

The impact strength modifier further includes, for example, a core/shell type impact strength modifier comprising a core section having rubber elasticity and a shell section made of a rigid thermoplastic resin component, which is suggested in U.S. Pat. No. 3,678,133, and an impact strength modifier obtained by polymerizing a specific alkyl acrylate after subjecting it to a homogenization treatment to prepare a rubber polymer, and polymerizing a vinyl monomer in the presence of the rubber polymer without adding an initiator, which is suggested in Japanese Unexamined Patent Publication, First Publication No. Sho 63-33764.

However, the impact resistance of the resin could not be improved sufficiently even when using any of these impact strength modifiers.

DISCLOSURE OF THE INVENTION

An object of the present invention is to provide an impact strength modifier, which improves the impact resistance, particularly impact resistance at low temperatures, of the resin and satisfactorily maintains the weathering resistance of the resulting molded article by adding a small amount of the impact strength modifier.

The impact strength modifier of the present invention can improve the impact resistance, particularly the impact resistance at low temperatures, of the resin and satisfactorily maintain the weathering resistance of the resin by adding a small amount of the impact strength modifier to the resin. Accordingly, a molded article of a resin composition incorporating this impact strength modifier is superior in impact resistance and also satisfactorily maintains its weathering resistance such as fade resistance or impact resistance. This impact strength modifier is particularly suited for incorporation into a vinyl chloride resin.

BEST MODE FOR CARRYING OUT THE INVENTION

Figure 1:
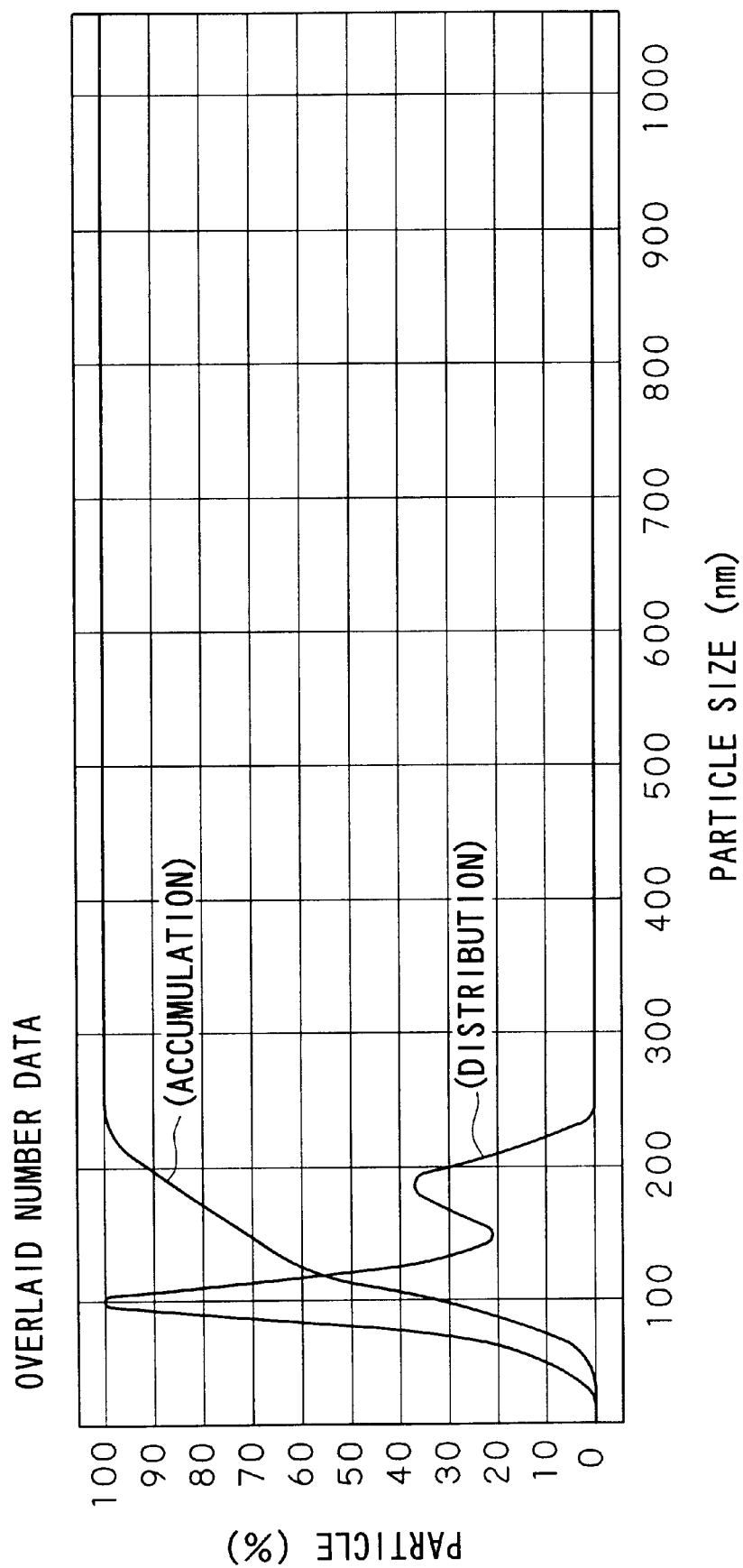
FIG. 1 is a graph showing a particle size distribution (number distribution) of a polyalkyl (meth)acrylate rubber of the Examples of the present invention.

The present invention will be described in detail below.

The polyalkyl (meth)acrylate rubber (A) used in the present invention contains, as a principal component, an acrylic rubber (A1) component and an acrylic rubber (A2) component. The acrylic rubber (A1) component contains, as a constituent component, at least one of a (meth)acrylate of an alcohol having a branched side chain or an alcohol having an alkyl group with 13 or more carbon atoms and a (meth) acrylate having a hydroxyl group, a methoxy group or an ethoxy group. The acrylic rubber (A2) component contains n-butyl acrylate as a constituent component.

The (meth)acrylate of the alcohol having a branched side chain or the alcohol having an alkyl group with 13 or more carbon atoms includes, for example, 2-ethylhexyl acrylate, tridecyl methacrylate, stearyl methacrylate, tridecyl acrylate, stearyl acrylate, or cetyl methacrylate. The (meth) acrylate having a hydroxyl group, a methoxy group or an ethoxy group includes, for example, ethoxyethyl acrylate, methoxypropyleneglycol acrylate, or 4-hydroxybutyl acrylate. Among these (meth)acrylates, 2-ethylhexyl acrylate, ethoxyethyl acrylate, methoxypropylene glycolacrylate, 4-hydroxybutylacrylate, tridecylmethacrylate, or stearyl methacrylate is preferably used, and 2-ethylhexyl acrylate is particularly preferably used.

The polyalkyl (meth)acrylate rubber (A) is preferably composed of the acrylic rubber (A1) component containing at least one of the above monomers as a constituent component and the acrylic rubber (A2) component containing n-butyl acrylate as a constituent component because the resulting impact strength modifier exhibits high impact resistance.

The polyalkyl (meth)acrylate rubber (A) is more preferably composed of the acrylic rubber (A1) component containing at least one of 2-ethylhexyl acrylate, tridecyl methacrylate and stearyl methacrylate as a constituent component and the acrylic rubber (A2) component containing n-butyl acrylate as a constituent component because the resulting impact strength modifier exhibits a high impact resistance at any temperature. The acrylic rubber (A1) component is most preferably composed of 2-ethylhexyl acrylate because the resulting impact strength modifier exhibits excellent impact resistance from a low temperature range.

With respect to the proportion of the acrylic rubber (A1) component and acrylic rubber (A2) component in the polyalkyl (meth) acrylate rubber (A), the amount of the acrylic rubber (A1) component is preferably within a range from 5 to 95% by weight and that of the acrylic rubber (A2) component is preferably within a range from 95 to 5% by weight because the resulting impact strength modifier exhibits higher impact resistance.

The polyalkyl (meth) acrylate rubber (A) preferably has two or more glass transition temperatures at 10° C. or lower and, furthermore, the glass transition temperature (Tg1) derived from the acrylic rubber (A1) component is preferably lower than the glass transition temperature (Tg2) derived from the acrylic rubber (A2) component. It is preferable for the glass transition temperature of the polyalkyl (meth)acrylate rubber (A) to meet these conditions because the resulting impact strength modifier with exhibit higher impact resistance.

The glass transition temperature of the polymer is measured as a transition point of Tan δ which is measured by a dynamic mechanical properties analyzer (hereinafter referred to as DMA) Generally, the polymer obtained from the monomer has an intrinsic glass transition temperature and one transition point was observed in the case of a homopolymer (random copolymer composed of a single of plural components), while plural intrinsic transition points are observed in case of a mixture composed of plural components, or a composite polymer.

If the polymer is composed of two components, two transition points are observed by the measurement. Although two peaks are observed in the Tan δ curve measured by DMA, the respective peaks are near to with each other and are sometimes observed as a peak with a shoulder if the two components drastically differ in composition ratio and have almost the same transition temperature. However, it can be differentiated from a simple one-peak curve.

The polyalkyl (meth)acrylate rubber (A) preferably contains a monomer having two or more unsaturated bonds in its molecule in the amount of 20% by weight or less. Such a monomer serves as a crosslinking agent or a graft cross agent.

Examples of the crosslinking agent include ethylene glycol dimethacrylate, propylene glycol dimethacrylate, 1,3-butylene glycol dimethacrylate, 1,4-butylene glycol dimethacrylate, divinylbenzene, and silicone such as polyfunctional methacrylic group-modified silicone.

Examples of the graft cross agent include allyl methacrylate, triallyl cyanurate, and triallyl isocyanurate. Allyl methacrylate can also be used as the crosslinking agent. These crosslinking agents and graft cross agents are used alone or in combination thereof.

These crosslinking agents and graft cross agents are preferably contained in the acrylic rubber (A1) component and acrylic rubber (A2) component, which constitute the polyalkyl (meth) acrylate rubber (A), in an amount within a range from 0 to 20% by weight. Furthermore, they are preferably contained in the acrylic rubber (A1) component and acrylic rubber (A2) component in the amount within a range from 0.1 to 20% by weight.

When these crosslinking agents and graft cross agents are contained in the amount within the above range, the resulting impact strength modifier exhibits more excellent impact resistance and the resin incorporated with this impact strength modifier is superior in processability. On the other hand, when the crosslinking agents and graft cross agents are contained in the polyalkyl (meth) acrylate rubber (A) in an amount larger than 20% by weight, the resulting impact strength modifier sometimes does not exhibit excellent impact resistance.

In the monomer constituting the polyalkyl (meth)acrylate rubber (A), various vinyl monomers, for example, an aromatic alkenyl compound such as styrene, α-methylstyrene or vinyl toluene; cyanated vinyl compound such as acrylonitrile or methacrylonitrile; methacrylic acid-modified silicone; and fluorine-containing vinyl compound may be added in an amount of 30% by weight or less.

Regarding the polyalkyl (meth)acrylate rubber (A), the number distribution of the particle size is a double dispersion distribution having at least two peaks within a range from 0.05 to 0.4 μm and, furthermore, not less than 70% by weight of the polyalkyl (meth)acrylate rubber (A) is occupied by particles having a particle size within a range from 0.05 to 0.4 μm. The impact strength modifier obtained by using the polyalkyl (meth)acrylate rubber (A), which exhibits such a particle size distribution, is preferred because it provides excellent impact resistance only by adding a small amount of it. Furthermore, when the number distribution of the particle size of the polyalkyl (meth)acrylate rubber (A) has at least one peak within a range from 0.05 to 0.15 μm and a range from 0.15 to 0.4 μm, an impact strength modifier having a more excellent impact resistance can be obtained.

As used herein, the number distribution refers to a distribution wherein the proportion of the number of particles, the particle size of which is within a microspace between a certain particle size $d_p$ and $d_p + \Delta d_p$, to all particles is represented by a percentage.

The method of preparing the polyalkyl (meth) acrylate rubber (A) is preferably a method of polymerizing a monomer containing, as a constituent component, at least one of a (meth)acrylate of an alcohol having a branched side chain or an alcohol having an alkyl group with 13 or more carbon atoms and a (meth)acrylate having a hydroxyl group, a methoxy group or an ethoxy group to obtain a latex of an acrylic rubber (A1) component, adding a monomer containing n-butyl acrylate constituting an acrylic rubber (A2) component in the latex of the acrylic rubber (A1) component, and polymerizing the latex impregnated with the monomer in the presence of a radical polymerization initiator. With the progress of the polymerization, a latex of the polyalkyl (meth)acrylate rubber (A) combined with the acrylic rubber (A1) component and the acrylic rubber (A2) component is obtained.

Alternatively, the polyalkyl (meth)acrylate rubber(A) may be prepared by subjecting n-butyl acrylate to dropwise addition polymerization in the presence of the acrylic rubber (A1) component. The resulting polyalkyl (meth)acrylate rubber (A) may be enlarged by an acid or base.

These polymerization methods are not specifically limited, but an emulsion polymerization method or, if necessary, a forced emulsion polymerization method is usually used.

As the acrylic rubber (A1) component, at least one of 2-ethylhexyl acrylate, tridecyl methacrylate and stearyl methacrylate is more preferably contained as a constituent component. Since these monomers have poor water solubility, the monomer is preferably polymerized by using the forced emulsion polymerization method if the acrylic rubber (A1) component is prepared by using the monomer. Even when a monomer, which generates a large amount of scales by a conventional emulsion polymerization method, is polymerized, the polymerization proceeds smoothly by using the forced emulsion polymerization method and a polyalkyl (meth)acrylate rubber (A) having the desired particle size is easily obtained.

As the emulsifier and dispersion stabilizer, known surfactants such as anionic, nonionic and cationic surfactants can be used. If necessary, a mixture thereof can be used, but an emulsifier having a large micelle forming capability and an emulsifier having a small micelle forming capability are preferably used in combination.

The method of adding the monomer containing n-butyl acrylate constituting the acrylic rubber (A2) component to the acrylic rubber (A1) component obtained by the forced emulsion polymerization method, and polymerizing the acrylic rubber (A1) component impregnated with the monomer is a preferable method which is effective to obtain an acrylic graft copolymer as a principal component of the impact strength modifier.

If the polyalkyl (meth)acrylate rubber (A) is obtained by polymerizing n-butyl acrylate constituting the acrylic rubber (A2) component in the presence of the acrylic rubber (A1) component obtained by the forced emulsion polymerization method and the number distribution of the particle size of the polyalkyl (meth)acrylate rubber (A) is a double dispersion distribution having at least two peaks within a range from 0.05 to 0.4 $\mu$m and not less than 70% by weight of the polyalkyl (meth) acrylate rubber (A) consists of particles having a particle size within a range from 0.05 to 0.4 $\mu$m, the impact strength modifier obtained by using this polyalkyl (meth)acrylate rubber (A) provides excellent impact resistance as compared with an impact strength modifier which is obtained from the polyalkyl (meth)acrylate rubber (A) obtained by mixing plural particles having different particle sizes, which is particularly preferred.

Examples of the vinyl monomer (B) to be graft-polymerized with the polyalkyl (meth)acrylate rubber (A) include various vinyl monomers, for example, an aromatic alkenyl compound such as styrene, $\alpha$-methylstyrene, or vinyl toluene; methacrylate such as methyl methacrylate, or 2-ethylhexyl methacrylate; acrylate such as methyl acrylate, ethyl acrylate or n-butyl acrylate, and cyanated vinyl compound such as acrlonitrile or methacrylonitrile. These vinyl monomers are used alone or in combination. If necessary, chain transfer agents and crosslinking agents may be used.

With respect to the proportion of the polyalkyl (meth) acrylate rubber (A) to the vinyl monomer (B) in the acrylic rubber graft copolymer, the amount of the polyalkyl (meth) acrylate rubber (A) is preferably within a range from 5 to 95% by weight, more preferably from 50 to 95% by weight, still more preferably from 80 to 95% by weight, and particularly preferably from 82 to 95% by weight, while the amount of the vinyl monomer (B) is preferably within a range from 95 to 5% by weight, more preferably from 50 to 5% by weight, still more preferably from 20 to 5% by weight, and particularly preferably from 18 to 5% by weight.

When the amount of the vinyl monomer (B) is smaller than 5% by weight, the dispersibility becomes poor in the resin composition and the processability is sometimes lowered when the resulting impact strength modifier is dispersed in the resin. On the other hand, when the amount exceeds 95% by weight, the resulting impact strength modifier sometimes does not exhibit sufficient impact resistance.

The acrylic graft copolymer can be obtained by single- or multi-stage polymerization using a method of adding the vinyl monomer (B) to the latex of the polyalkyl (meth) acrylate and subjecting the mixture to the radical polymerization.

The impact strength modifier is obtained by charging an acrylic rubber graft copolymer latex in hot water, in which an acid such as sulfuric acid or hydrochloric acid, or a metal salt such as calcium chloride, calcium acetate or magnesium sulfate is dissolved, followed by salting-out, solidification, separation and further recovering. At this time, salts such as sodium carbonate and sodium sulfate may be used in combination. It may be obtained by a direct drying method such as spray-drying method.

The impact strength modifier thus obtained can be incorporated into various resins, including a rigid vinyl chloride resin (PVC resin).

Examples of the resin other than the rigid vinyl chloride resin (PVC resin) include olefin resin (olefin resin) such as semi-rigid and soft vinyl chloride resin (PVC resin), polypropylene (PP), or polyethylene (PE); styrene resin (St resin) such as polystyrene (PS), high-impact polystyrene (HIPS), (meth)acrylate-styrene copolymer (MS), styrene-acrylonitrile copolymer (SAN), styrene-maleic anhydride copolymer (SMA), ABS, ASA, or AES; acrylic resin (Ac resin) such as methyl polymethacrylate (PMMA); polycarbonate resin (PC resin); polyamide resin (PA resin); polyester resin (PEs resin) such as polyethylene terephthalate (PET), or polybutylene terephthalate (PBT); engineering plastics such as (modified) polyphenylene ether resin (PPE resin), polyoxymethylene resin (POM resin), polysulfon resin (PSO resin), polyarylate resin (PAr resin), polyphenylene resin (PPS resin), or thermoplastic polyurethane resin (PU resin); thermoplastic elastomer (TPE) such as styrene elastomer, olefin elastomer, vinyl chloride elastomer, urethane elastomer, polyester elastomer, polyamide elastomer, fluorine elastomer, 1,2-polybutadiene, or trans 1,4-polyisoprene; and polymer alloy, for example, PC resin/St resin alloy such as PC/ABS; PVC resin/St resin alloy such as PVC/ABS; PA resin/St resin alloy such as PA/ABS;PA resin/TPE alloy; PA resin/polyolefin resin alloy such as PA/PP; PC resin/PEs resin alloy such as PBT resin/TPE or PC/PBT; alloy of olefin resins, such as polyolefin resin/TPE or PP/PE; PPE resin alloy such as PPE/HIPS, PPE/PBT, or PPE/PA; or PVC resin/Ac. resin alloy such as PVC/PMMA.

If the impact strength modifier is incorporated into these resins, known stabilizers and fillers can be added during the compounding, kneading or molding according to the intended use, as far as the physical properties of these resins are not impaired.

The impact strength modifier is preferably incorporated in an amount within a range from 0.01 to 50 parts, more preferably from 0.1 to 30 parts by weight, and particularly preferably from 1 to 20 parts by weight, based on 100 parts by weight of these resins.

Examples of the stabilizer include metal-based stabilizers, for example, lead stabilizer such as tribasic lead sulfate, dibasic lead phosphite, basic lead sulfite, or lead silicate; metal soap stabilizer derived from a metal such as potassium, magnesium, barium, zinc, cadmium, or lead and fatty acid such as 2-ethylhexanoic acid, lauric acid, myristic acid, palmitic acid, stearic acid, isostearic acid, hydroxystearic acid, oleic acid, ricinoleic acid, linoleic acid, or behenic acid; organotin stabilizer derived from an alkyl group or an ester group and fatty acid salt, maleate or sulfide; composite metal soap stabilizer such as Ba—Zn, Ca—Zn, Ba—Ca—Sn, Ca—Mg—Sn, Ca—Zn—Sn, Pb—Sn, or Pb—Ba—Ca; metal salt stabilizer derived usually from a group of metal such as barium or zinc and two or more organic acids such as a branched fatty acid (e.g. 2-ethylhexanoic acid, isodecanoic acid, trialkylacetic acid, etc.), unsaturated acid (e.g. oleic acid, ricinoleic acid, linoleic acid, etc.), alicyclic acid (e.g. naphthenic acid, etc.) and aromatic acid (e.g. carbolic acid, benzoic acid, salicylic acid, substituted derivatives thereof, etc.) and a metal salt liquid stabilizer obtained by dissolving these stabilizers in an organic solvent such as petroleum-based hydrocarbon, alcohol or glycerin derivative, and incorporating auxiliary stabilizers such as phosphite, epoxy compounds, color development inhibitors, transparency modifiers, photostabilizers, antioxidants, plate-out inhibitors and lubricants; and nonmetal-based stabilizers, for example, epoxydated compound such as epoxy resin, epoxidated soybean oil, epoxidated vegetable oil, or epoxidated fatty acid alkyl ester; organophosphite which contains phosphorous substituted with an alkyl group, an aryl group, a cycloalkyl group, or an alkoxy group and also contains a dihydric alcohol (e.g. propylene glycol, etc.) or an aromatic compound (e.g. hydroquinone, bisphenol A, etc.); hindered phenol such as bisphenol dimerized by BHT, sulfur, or a methylene group; ultraviolet absorber such as salicylate, benzophenone, or benzotriazole; photostabilizer such as hindered amine or nickel complex salt; ultraviolet screening agent such as carbon black or Rutile type titanium oxide; polyhydric alcohol such as trimethylolpropane, pentaerythritol, sorbitol, or mannitol; nitrogen-containing compound such as β-aminocrotonate, 2-phenylindole, diphenylthiourea, or dicyandiamide; sulfur-containing compound such as dialkylthiodipropionate; keto compound such as acetoacetate, dehydroacetic acid, or β-diketone; organosilicon compound; and borate.

Examples of the filler include carbonate such as ground limestone, precipitated limestone, or gelatinous limestone; inorganic fillers such as titanium oxide, clay, talc, mica, silica, carbon black, graphite, glass beads, glass fiber, carbon fiber, and metal fiber; organic fillers such as organic fiber made of polyamide, and silicone; and natural organic material such as wood flour.

There can also be added impact strength modifiers such as MBS, ABS, AES, NBR, EVA, chlorinated polyethylene, acrylic rubber, polyalkyl (meth)acrylate rubber graft copolymer, and thermoplastic elastomer; processing aids such as (meth)acrylate copolymer; alkyl esters of aromatic polybasic acids, such as dibutyl phthalate, dioctyl phthalate, diisodecyl phthalate, diisononyl phthalate, diundecyl phthalate, trioctyl trimellitate, triisooctyl trimellitate, and pyromellitate; alkyl esters of aliphatic polybasic fatty acids, such as dibutyl adipate, dioctyl adipate, dithiononyl adipate, dibutyl azelate, dioctyl azelate, and diisononyl azelate; phosphates such as tricresyl phosphate; polyester plasticizers such as those obtained by sealing the ends of a polycondensate having a molecular weight within a range from about 600 to 8,000, which is prepared from a polyhydric carboxylic acid (e.g. adipic acid, azelaic acid, sebacic acid, phthalic acid, etc.) and a polyhydric alcohol (e.g. ethylene glycol, 1,2-propylene glycol, 1,2-butyleneglycol, 1,3-butyleneglycol, 1,4-butyleneglycol, etc.), with a monohydric alcohol or a monohydric carboxylic acid; epoxy plasticizers such as epoxidated soybean oil, epoxidated linseed oil, and epoxidated tall oil fatty acid-2-ethylhexyl; plasticizers such as chlorinated paraffin. There can also be added lubricant. Examples of the lubricant include pure hydrocarbons such as liquid paraffin and low-molecular polyethylene; halogenated hydrocarbon; fatty acids such as higher fatty acid and oxyfatty acid; fatty amides such as fatty amide; polyhydric alcohol esters of fatty acids, such as gyceride; fatty alcohol ester (ester wax) of fatty acid; metal soap; fatty alcohol; polyhydric alcohol;, polyglycol; polyglycerol; esters such as partial ester of fatty acid and polyhydric alcohol, and partial ester of fatty acid and polyglycol orpolyglycerol; (meth)acrylate copolymer.

There can also be added flame retardants such as chlorinated paraffin, aluminum hydroxide, antimony trioxide, and halogen compound; heat resistance modifiers such as (meth) acrylate copolymer, imide copolymer, and styrene-acrylonitrile copolymer; mold release agents; nucleating agents; fluidity modifiers; colorants; antistatic agents; conductivity-imparting agents; surfactants; anti-fogging agents; blowing agents; and anti-fungus agents.

A method of preparing a resin composition by incorporating an impact strength modifier into a resin is not specifically limited, but a melt-mixing method is particularly preferred. A small amount of a solvent may be used, but not be used usually.

Examples of the mixing device include an extruder, Banbury mixer, roller, and kneader, and these mixing devices are operated in a batch-wise manner or continuously. There is no limitation on the mixing order.

EXAMPLES

The following Examples and Comparative Examples further illustrate the present invention in detail. In the description, "parts" and "percentages" are by weight unless otherwise stated.

Preparation Example 1

Preparation of Acrylic Rubber Graft Copolymer (1)

99.5 Parts of 2-ethylhexyl acrylate and 0.5 parts of allyl methacrylate were mixed to obtain 100 parts of a (meth) acrylate monomer mixture. To 195 parts of distilled water, in which 1 part of dipotassium alkenylsuccinate was dissolved, 100 parts of the (meth)acrylate monomer mixture was added. After preliminarily stirring at 10,000 rpm using a homomixer, the mixture was emulsified and then dispersed under a pressure of 300 kg/cm$^2$ by using a homogenizer to obtain a (meth)acrylate emulsion.

This mixed solution was transferred to a separable flask equipped with a condenser and a stirring blade and then heated while replacing by nitrogen and mixing with stirring. Upon reaching 50° C., 0.5 parts of tert-butyl hydroperoxide was added and, after heating to 50° C., a mixed solution of 0.002 parts of ferrous sulfate, 0.006 parts of disodium ethylenediamine tetraacetate, 0.26 parts of Rongalit and 5 parts of distilled water was added. Then, the polymerization was completed by being left to stand for five hours to obtain an acrylic rubber latex (A1).

The polymerization rate of the resulting acrylic rubber latex (A1) was 99.9%. This latex was solidified with ethanol and then dried to obtain a solid and the gel content was measured by extracting with toluene at 90° C. for 12 hours. As a result, the gel content was 92.4%.

The acrylic rubber latex (A1) was charged in a separable flask equipped with a stirrer. The solid content of poly 2-ethylhexyl acrylate and allyl acrylate in the system was 10 parts. After adding distilled water to make the amount of distilled water in the system 195 parts, a mixed solution of 78 parts of n-butyl acrylate containing 2.0% allyl methacrylate, which constitutes the acrylic rubber (A2) component, and 0.32 parts of tert-butyl hydroperoxide was charged, and then this mixed solution was made to penetrate into the acrylic rubber latex (A1) particles by stirring for 10 minutes. Furthermore, 0.5 parts of polyoxyethylene ether sulfate was added and, after stirring for 10 minutes, the system was replaced by nitrogen and heated to 50° C. A mixed solution of 0.002 parts of ferrous sulfate, 0.006 parts of disodium ethylenediamine tetraacetate, 0.26 parts of Rongalit and 5 parts of distilled water was charged and the radical polymerization was initiated. Then, the polymerization was completed by maintaining at an inner temperature of 70° C. for two hours to obtain a latex of a polyalkyl (meth) acrylate rubber (A) A portion of this latex was collected and the particle size distribution of the polyalkyl (meth)acrylate rubber (A) was measured. This latex was dried to obtain a solid and the gel content was measured by extracting with toluene at 90° C. for 12 hours. As a result, the gel content was 98.3%.

To the latex of the polyalkyl (meth)acrylate rubber (A), a mixed solution of 0.06 parts of tert-butyl hydroperxoxide and 12 parts of methyl methacrylate was added dropwise at 70° C. over 15 minutes, and then the graft polymerization of the vinyl monomer (B) to the polyalkyl (meth)acrylate rubber (A) was completed by maintaining at 70° C. for four hours. The polymerization rate of the methyl methacrylate was 99.4%.

The resulting acrylic rubber graft copolymer latex was added dropwise in 200 parts of hot water containing 1.5% calcium chloride, followed by solidification, separation, washing and further drying at 75° C. for 16 hours to prepare a powdered acrylic rubber graft copolymer (1), which was used as an impact strength modifier (1).

The composition is shown in Table 1.

The abbreviations in Table 1 are as follows.
2EHA: 2-ethylhexyl acrylate
SMA: stearyl methacrylate
BA: butyl acrylate
AMA: allyl methacrylate
MMA: methyl methacrylate The glass transition temperature of the acrylic rubber graft copolymer (1) was measured. This measured glass transition temperature is a value derived from the polyalkyl (meth) acrylate rubber (A). The results are shown in Table 2.

The particle size distribution and glass transition temperature were measured by the following procedure.

1) Measurement of Particle Size Distribution of Polyalkyl (meth)acrylate Rubber (A)

Using samples prepared by diluting the resulting latex with distilled water, the particle size distribution was measured by using a particle size distribution meter, Model CHDF2000, manufactured by MATEC USA Co. The measurement was conducted under the standard conditions recommended by MATEC Co. Using an exclusive capillary type cartridge for particle separation and a carrier solution, 0.1 ml of each diluted latex sample having a concentration of about 3% was used for measurement under the fixed conditions of neutral pH, a flow rate of 1.4 ml/minute, a pressure of about 4000 psi and a temperature of 35° C. As the particle size standard, 12 kinds of monodisperse polystyrene having a known particle size within a range from 0.02 to 0.8 μm (manufactured by DUKE USA Co.) were used.

2) Measurement of Glass Transition Temperature of Acrylic Rubber Graft Copolymer A plate, which was obtained by forming 70 parts of the resulting acrylic rubber graft copolymer (1) and 30 parts of methyl polymethacrylate (PMMA) into pellets using a 25Φ single-screw extruder at 250° C. and forming pellets into a plate having a thickness of 3 mm using a press machine set at 200° C., was cut into samples having a width of 10 mm and a length of 12 mm. Using a meter, Model DMA983, manufactured by TA Instruments Co., the measurement was conducted under the conditions of a heating rate of 2° C./minute and the temperature corresponding to the transition point of the resulting Tan δ curve was determined as the glass transition temperature.

TABLE 1

| | Polyalkyl (meth)acrylate rubber (A) | | | | | | | Acrylic rubber graft copolymer |
| --- | --- | --- | --- | --- | --- | --- | --- | --- |
| | A1 component | | | | A2 component | | A1 component/A2 | Graft ratio |
| Preparation Example No. | 2EHA (%) | SMA (%) | BA (%) | AMA (%) | BA (%) | 2EHA (%) | AMA (%) | component (weight ratio) | (A)/(B) (weight ratio) |
| 1 | 99.5 | — | — | 0.5 | 98 | — | 2 | 10/78 | 88/12 |
| 2 | 99.5 | — | — | 0.5 | 98 | — | 2 | 20/68 | 88/12 |
| 3 | 99.5 | — | — | 0.5 | 98 | — | 2 | 30/58 | 88/12 |
| 4 | 99.0 | — | — | 1.0 | 98 | — | 2 | 30/55 | 88/12 |
| 5 | 99.0 | — | — | 1.0 | 98 | — | 2 | 10/75 | 85/15 |
| 6 | 99.0 | — | — | 1.0 | 98 | — | 2 | 75/10 | 85/15 |
| 7 | 99.0 | — | — | 1.0 | 48 | 50 | 2 | 30/55 | 85/15 |
| 8 | 100 | — | — | — | 98 | — | 2 | 30/55 | 85/15 |
| 9 | 70.0 | 29 | — | 1.0 | 98 | — | 2 | 30/55 | 85/15 |
| 10 | 70.0 | — | 29 | 1.0 | 98 | — | 2 | 30/55 | 85/15 |
| 11 | — | — | — | — | 98 | — | 2 | 0/85 | 85/15 |
| 12 | 63.0 | — | 35 | 2.0 | — | — | — | 85/0 | 85/15 |
| 13 | — | — | — | — | 98 | — | 2 | 0/85 | 85/15 |

In Table 1, a graft ratio is a weight ratio in case graft polymerization of the polyalkyl (meth) acrylate rubber (A) and the vinyl monomer (B) is conducted.

TABLE 2

| | Impact strength modifier incorporated | | | Particle size distribution of polyalkyl (meth)acrylate rubber (A) | | |
|---|---|---|---|---|---|---|
| | | Glass transition temperature (° C.) | | | | Proportion of particles having a particle size |
| Example No. | Types of impact strength modifier | derived from A1 component | derived from A2 component | Distribution state | Peak position (μm) | ranging from 0.05 to 0.4 μm (% by weight) |
| 1 | (1) | −55 | −28 | Double dispersion | 0.20 0.10 | >90 |
| 2 | (2) | −55 | −28 | Double dispersion | 0.19 0.11 | >90 |
| 3 | (3) | −55 | −28 | Double dispersion | 0.20 0.11 | >90 |
| 4 | (4) | −52 | −28 | Double dispersion | 0.19 0.10 | >90 |
| 5 | (5) | −52 | −28 | Double dispersion | 0.19 0.11 | >90 |
| 6 | (6) | −52 | −28 | Double dispersion | 0.19 0.11 | >90 |
| 7 | (7) | −52 | −39 | Double dispersion | 0.19 0.11 | >90 |
| 8 | (8) | −65 | −28 | Double dispersion | 0.19 0.11 | >90 |
| 9 | (9) | −45 | −28 | Double dispersion | 0.19 0.11 | >90 |
| 10 | (10) | −41 | −30 | Double dispersion | 0.19 0.11 | >90 |

Preparation Examples 2 to 10

Preparation of Acrylic Rubber Graft Copolymers (2) to (10)

Using the same procedure as in Preparation Example 1, except that the monomers which constitute the acrylic rubber (A1) component and the acrylic rubber (A2) component, and the weight ratio thereof as well as the graft ratio of the polyalkyl (meth)acrylate rubber (A) to the vinyl monomer (B) were as shown in Table 1, acrylic rubber graft copolymers (2) to (10) were prepared and used as impact strength modifiers (2) to (10).

Using the same procedure as in Preparation Example 1, the particle size distribution of the polyalkyl (meth)acrylate rubber (A) and the glass transition temperature of the acrylic rubber graft copolymers (2) to (10) were measured. The results are shown in Table 2.

Figure 2:
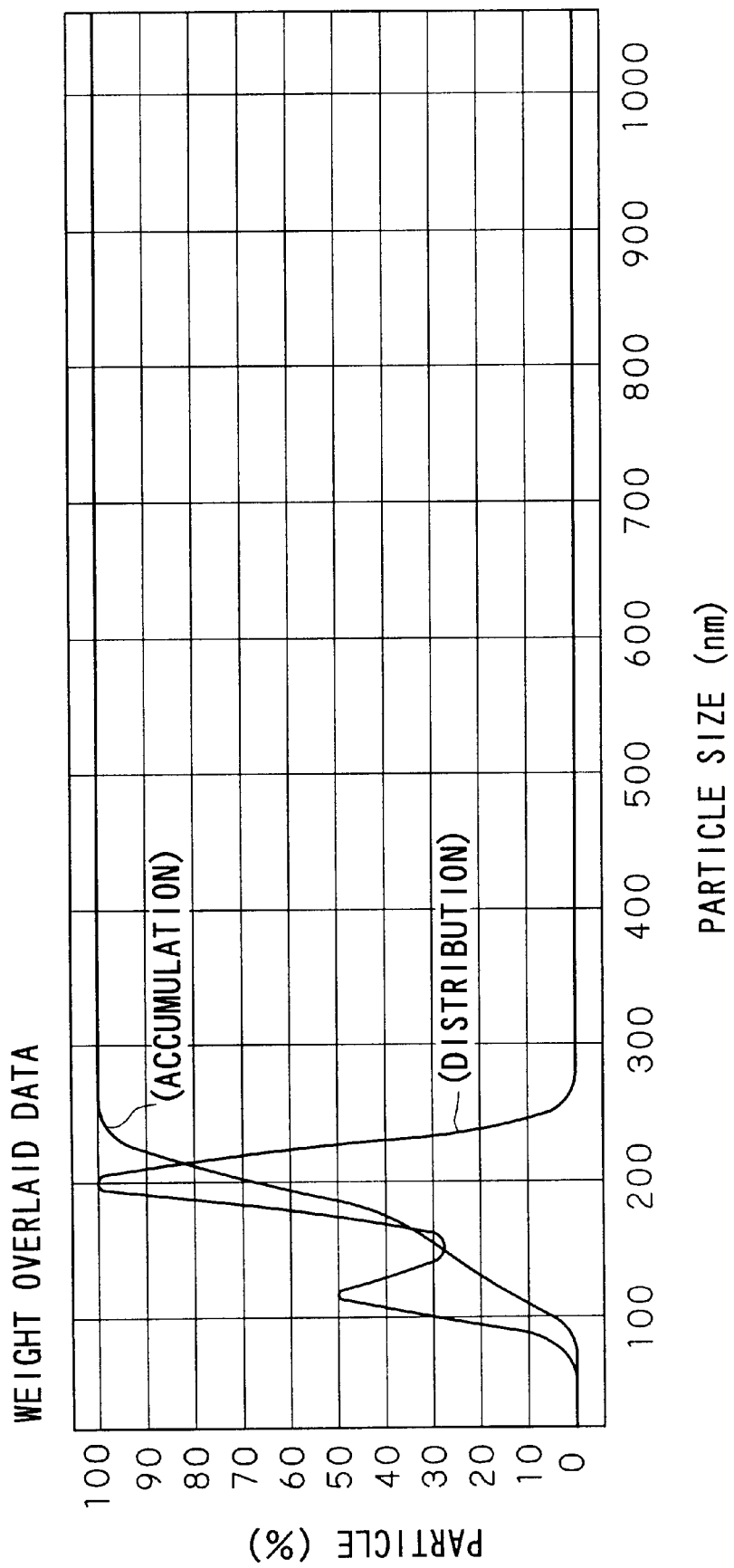
FIG. 2 is a graph showing a particle size distribution (weight distribution) of a polyalkyl (meth) acrylate rubber of the Examples of the present invention.

The particle size distribution of the polyalkyl (meth) acrylate rubber (A) prepared in Preparation Example 2 is shown in FIG. 1 and FIG. 2. FIG. 1 shows a number distribution, while FIG. 2 shows a weight distribution.

Preparation Example 11

Preparation of Acrylic Rubber Graft Copolymer (11)

295 Parts of distilled water and 0.4 parts of sodium dodecylbenzenesulfonate were charged in a separable flask equipped with a stirrer and heated to 50° C. after replacing by nitrogen. After charging a mixed solution of 85 parts of n-butyl acrylate containing 2% allylmethacrylate and 0.4 parts of tert-butyl hydroperoxide and stirring for 30 minutes, a mixed solution of 0.002 parts of ferrous sulfate, 0.006 parts of disodium ethylenediamine tetraacetate, 0.26 parts of Rongalit and 5 parts of distilled water was charged and the radical polymerization was initiated, and then the polymerization was completed by maintaining at an inner temperature of 70° C. for two hours to obtain a polyalkyl (meth) acrylate rubber latex. A portion of this latex was collected and the average particle size of the polyalkyl (meth) acrylate rubber was measured. The result was 0.22 μm and the particle size distribution had only one peak. This latex was dried to obtain a solid and the gel content was measured by extracting with toluene at 90° C. for 12 hours. The result was 97.3%.

To this polyalkyl (meth)acrylate rubber latex, a mixed solution of 0.06 parts of tert-butyl hydroperxoxide and 15 parts of methyl methacrylate was added dropwise at 70° C. over 15 minutes, and then the graft polymerization to the polyalkyl (meth)acrylate rubber was completed by maintaining at 70° C. for four hours.

The polymerization rate of the methyl methacrylate was 97.2%.

The resulting graft copolymer latex was added dropwise in 200 parts of hot water containing 1.5% calcium chloride, followed by solidification, separation, washing and further drying at 75° C. for 16 hours to prepare a powdered acrylic rubber graft copolymer (11), which was used as an impact strength modifier (11). The composition is shown in Table 1. Using the same procedure as in Preparation Example 1, the glass transition temperature of the acrylic rubber graft copolymer (11) was measured. The results are shown in Table 3.

Preparation Example 12

Preparation of Acrylic Rubber Graft Copolymer (12)

The acrylic rubber (A1) component prepared according to the composition shown in Table 1 was subjected to graft polymerization as it is without adding the acrylic rubber (A2) component thereto. The polymerization rate of the methyl methacrylate was 98.1%. The resulting graft copolymer latex was added dropwise in 200 parts of hot water containing 1.5% calcium chloride, followed by solidification, separation, washing and further drying at 75° C. for 16 hours to prepare a powdered acrylic rubber graft copolymer (12), which was used as an impact strength modifier (12).

The composition is shown in Table 1. Using the same procedure as in Preparation Example 1, the particle size distribution of the polyalkyl (meth)acrylate rubber and the glass transition temperature of the acrylic rubber graft copolymer (12) were measured. The results are shown in Table 3.

Preparation Example 13

Preparation of Acrylic Rubber Graft Copolymer (13)

Using the same procedure as in Preparation Example 11, except that the amount of sodium dodecylbenzenesulfonate was changed to 1.0 parts, an acrylic rubber graft copolymer latex, with a particle size distribution having only one peak located at 0.10 μm, was obtained. In the same procedure as in Preparation Example 11, solidification, separation, washing and further drying were conducted to prepare a powdered acrylic rubber graft copolymer (13), which was used as an impact strength modifier (13).

The composition is shown in Table 1. Using the same procedure as in Preparation Example 1, the glass transition temperature of the acrylic rubber graft copolymer (13) was measured. The results are shown in Table 3.

Preparation Example 14

Preparation of Acrylic Rubber Graft Copolymer (14)

After the acrylic rubber graft copolymer latex having a particle size of 0.22 μm obtained in Preparation Example 11 was mixed with the acrylic rubber graft copolymer latex obtained in Preparation Example 13 so that {number ($N_{0.1}$) of particles having a center particle size of 0.1 μm}/{number ($N_{0.2}$) of particles having a center particle size of 0.22 μm} becomes 2, the mixture was added dropwise in 200 parts of hot water containing 1.5% calcium chloride, followed by solidification, separation, washing and further drying at 75° C. for 16 hours to prepare a powdered acrylic rubber graft copolymer (14), which was used as an impact strength modifier (14).

Using the same procedure as in Preparation Example 1, the particle size distribution of the polyalkyl (meth)acrylate rubber and the glass transition temperature of the acrylic rubber graft copolymer (14) were measured. The results are shown in Table 3.

Examples 1 to 10

The impact resistance and weathering resistance of each of the vinyl chloride resin compositions obtained by using the acrylic rubber graft copolymers (1) to (10) as the impact strength modifiers (1) to (10), respectively, and incorporating them into rigid vinyl chloride resins, were evaluated by the following procedure.

The results are shown in Table 4.

1) Impact resistance: evaluated by Izod impact resistance. Vinyl chloride compositions were prepared according to the following two kinds of compositions (compositions A and B) and extruded into square bars of ½ inch×¼ inch in size using a 25 mmφ single-screw extruder controlled to 190° C., and then the impact resistance was evaluated by the method defined in ASTM D256. The Izod impact resistance of the vinyl chloride resin composition of composition A was measured at 23° C., while that of the vinyl chloride resin composition of composition B was measured at 0° C., which are respectively described as measurement A and measurement B in the table.

| | | |
|---|---|---|
| Composition A | Vinyl chloride resin (polymerization degree: 700) | 100 parts |
| | Dibutyltin maleate | 3.5 parts |
| | Stearl alcohol | 0.8 parts |
| | Processing aid (Metablen P-700) | 0.4 parts |
| | Carbon black | 0.5 parts |
| | Modifier | 7.5 parts |
| Composition B | Vinyl chloride resin (polymerization degree: 1100) | 100 parts |
| | Dibasic lead phosphite | 2.5 parts |
| | Dibasic lead stearate | 0.7 parts |
| | Lead stearate | 0.5 parts |
| | Calcium stearate | 0.9 parts |
| | Polyethylene wax (molecular weight: 2200) | 0.1 parts |
| | Calcium carbonate | 5.0 parts |
| | Processing aid (Metablen P-501) | 1.0 parts |
| | Carbon black | 0.5 parts |
| | Modifier | 7.5 parts |

2) Weathering resistance: An operation of subjecting each of the sheet specimens obtained by preparing vinyl chloride resin compositions according to the composition B, kneading at 200° C. for 6 minutes using a 6 inch test roll machine manufactured by Kansai Roll Co., Ltd. at 15 rpm for five minutes, interposed between dies at 200° C. and cooling while applying a pressure of 50 kg/cm², to an Eyesuper UV

TABLE 3

| Comp. Example No. | Impact strength modifier incorporated | | | Particle size distribution of polyalkyl (meth)acrylate rubber | | |
|---|---|---|---|---|---|---|
| | Types of impact strength modifier | Glass transition temperature (° C.) | | | | Proportion of particles having a particle size ranging from 0.05 to 0.4 μm (% by weight) |
| | | derived from A1 component | derived from A2 component | Distribution state | Peak position (μm) | |
| 1 | (11) | — | −28 | Mono dispersion | 0.22 | — |
| 2 | (12) | −44 | — | Mono dispersion | 0.24 | — |
| 3 | (13) | — | −28 | Mono dispersion | 0.10 | >90 |
| 4 | (14) | — | −28 | Double dispersion | 0.22 / 0.10 | >90 |
| 5 | Metablen C-223 | — | −61 | — | — | — | tester controlled to a temperature of 60° C., manufactured by Dainippon Plastics Co., Ltd., for eight hours and leaving to stand in a thermo-hygrostat controlled to a temperature of 60° C. and a humidity of 95% for 16 hours was repeated five times, and then the appearance of each specimen sheet was visually evaluated.

In Table 4, the symbol ○ indicates "good", while the symbol X indicates "poor".

Comparative Examples 1 to 5

In the same procedure as in Example 1, except that the acrylic rubber graft copolymers (11) to (14) were used as the impact strength modifiers (11) to (14) in Comparative Examples 1 to 4 and a commercially available MBS modifier "Metablen C-223" manufactured by Mitsubishi Rayon was used as the impact strength modifier in Comparative Example 5, and then incorporated into the vinyl chloride resin, vinyl chloride resin compositions were prepared.

The impact resistance and weathering resistance of the resulting vinyl chloride resin compositions were evaluated using the same procedure as in Example 1.

The results are shown in Table 4.

(Tg2) derived from the acrylic rubber (A2) component and, furthermore, Tg1 was lower than Tg2 and both are lower than 10° C.

On the other hand, regarding the acrylic rubber graft copolymers (11) to (14) of Preparation Examples 11 to 14, the polyalkyl (meth) acrylate rubber (A) is not composed of the acrylic rubber (A1) component and the acrylic rubber (A2) component. Therefore, the vinyl chloride resin compositions of Comparative Examples 1 to 4 incorporating the acrylic rubber graft copolymers (11) to (14) were inferior in impact resistance. The vinyl chloride resin composition of Comparative Example 5 incorporating the MBS modifier "Metablen C-223" was superior in impact resistance, but exhibited poor weathering resistance because fading occurred in the specimen after subjecting to the weathering test.

Then, the impact strength modifiers (2,5) obtained in the Preparation Examples described above and a new impact strength modifier (15) prepared by changing the vinyl monomer (B) component were mixed with the thermoplastic resin other than the vinyl chloride resin, and the impact strength of each was measured (Examples 11 to 15).

TABLE 4

| Example and Comp. Example No. | Types of impact strength modifier | Physical properties of vinyl chloride resin composition | | |
|---|---|---|---|---|
| | | Weathering resistance Fade resistance | Impact resistance (J/m) | |
| | | | Measurement A | Measurement B |
| Example 1 | (1) | ○ | 1090 | 190 |
| Example 2 | (2) | ○ | 950 | 210 |
| Example 3 | (3) | ○ | 880 | 300 |
| Example 4 | (4) | ○ | 1090 | 350 |
| Example 5 | (5) | ○ | 850 | 210 |
| Example 6 | (6) | ○ | 900 | 330 |
| Example 7 | (7) | ○ | 1220 | 400 |
| Example 8 | (8) | ○ | 1180 | 480 |
| Example 9 | (9) | ○ | 720 | 180 |
| Example 10 | (10) | ○ | 780 | 190 |
| Comp. Example 1 | (11) | ○ | 110 | 30 |
| Comp. Example 2 | (12) | ○ | 140 | 60 |
| Comp. Example 3 | (13) | ○ | 130 | 30 |
| Comp. Example 4 | (14) | ○ | 110 | 60 |
| Comp. Example 5 | Metablen C-223 | X | 1120 | 430 |

As shown in Table 4, the vinyl chloride resin compositions of Examples 1 to 10 incorporated with the acrylic rubber graft copolymers (1) to (10) of Preparation Examples 1 to 10 as the impact strength modifier were superior in both the weathering resistance and impact resistance and also exhibited good impact resistance at low temperatures.

As shown in FIG. 1, the number distribution of the particle size of the polyalkyl (meth)acrylate rubber of Preparation Example 2 was a double dispersion distribution having at least two peaks at 0.11 μm and 0.19 μm. As shown in FIG. 2, not less than 90% by weight of the total weight of the polyalkyl (meth)acrylate rubber consists of particles having a particle size within a range from 0.05 to 0.4 μm. The particle size distribution of each of polyalkyl (meth) acrylate rubbers of Preparation Examples 1 and 3–10 exhibited almost the same double distribution, although the graphs are omitted.

As shown in Table 2, any of the acrylic rubber graft copolymers (1) to (10) of Preparation Examples 1 to 10 had a glass transition temperature (Tg1) derived from the acrylic rubber (A1) component and a glass transition temperature Preparation Example 15

Preparation of Acrylic Rubber Graft Copolymer (15)

Using the same procedure as in Preparation Example 2, except that the vinyl monomer (B) component was replaced by a copolymer component wherein the ratio of the weight ($M_{AN}$) of acrylonitrile to the weight ($M_{ST}$) of styrene, $M_{AN}:M_{ST}$, was 1:3, and that ratio is as shown in Table 5, the solidification, separation, washing and further drying were conducted to prepare a powdered acrylic rubber graft copolymer (15), which was used as an impact strength modifier (15).

In the same procedure as in Preparation Example. 1, the particle size distribution of the polyalkyl (meth)acrylate rubber and the glass transition temperature of the acrylic rubber graft copolymer (15) were measured. The results are shown in Table 6. (Examples 11 to 15)

After each of the impact strength modifiers (2, 5, 15) was mixed with a thermoplastic resin according to each composition shown in Table 7 using a Henschel mixer for four minutes, the mixture was melt-kneaded at a cylinder temperature of 260° C. using a 30 mmφ twin-screw extruder and then formed into pellets made of each of the thermoplastic resin compositions. These pellets were injection-molded to obtain ¼ inch Izod specimens. The impact strength of each specimen was measured. The results are shown in Table 8. A molded article made of any of the resin compositions exhibited good appearance. As the thermoplastic resin, the following resins were used.

Polycarbonate resin: Bisphenol A type polycarbonate (hereinafter referred to as PC) having a viscosity-average molecular weight of about 22000 was used.

Polyester resin: Polytetramethylene terephthalate (hereinafter referred to as PBT) having an intrinsic viscosity [η] of 1.05 was used.

Polyphenylene ether resin: Poly(2,6-dimethyl-1,4-phenylene)ether (manufactured by Japan GE Plastics Co., Ltd.) (hereinafter referred to as PPE) having an intrinsic viscosity (chloroform, 25° C.) of 0.48 dl/g was used.

Polystyrene resin: Tobolex 876-HF (high-impact polystyrene (hereinafter referred to as HIPS), manufactured by Mitsui Chemicals Co., Ltd.) was used.

ABS resin: Dia Pet 3001 manufactured by Mitsubishi Rayon (hereinafter referred to as ABS) was used.

SANresin: SR30B manufactured by Ube Saikon Co., Ltd. (hereinafter referred to as SAN) was used.

PPS resin: Torprene PPS manufactured by Tonen Chemicals Co., Ltd. (hereinafter referred to as PPS) was used.

TABLE 8

| Example No. | Izod impact strength (J/m) |
| --- | --- |
| 11 | 770 |
| 12 | 600 |
| 13 | 210 |
| 14 | 700 |
| 15 | 210 |

As is apparent from the results shown in Table 8, the impact strength modifier of the present invention can improve the impact resistance of any of the thermoplastic resins shown in the Examples.

INDUSTRIAL APLICABILITY

As described above, since this impact strength modifier comprises, as a principal component, an acrylic rubber graft copolymer which is obtained by graft polymerization of a polyalkyl (meth)acrylate (A) rubber containing a plurality of acrylic rubber components composed of a specific monomer as a principal component and a vinyl monomer (B), it is made possible to improve the impact resistance, particularly the impact resistance at low temperatures, of the resin and to satisfactorily maintain the weathering resistance by adding a small amount of the impact strength modifier to the resin. Accordingly, a molded article of a resin composition incorporating this impact strength modifier is superior in impact

TABLE 5

| | Polyalkyl (meth)acrylate rubber (A) | | | | | | | Acrylic rubber graft copolymer | |
| --- | --- | --- | --- | --- | --- | --- | --- | --- | --- |
| | A1 component | | | | A2 component | | | A1 component/ | Graft ratio |
| Preparation Example No. | 2EHA (%) | SMA (%) | BA (%) | AMA (%) | BA (%) | 2EHA (%) | AMA (%) | A2 component (weight ratio) | (A)/(B) (weight ratio) |
| 15 | 99.5 | — | — | 0.5 | 98 | — | 2 | 10/78 | 82/18 |

TABLE 6

| | Impact strength modifier | | | Particle size distribution of polyalkyl (meth)acrylate rubber (A) | | |
| --- | --- | --- | --- | --- | --- | --- |
| | Types of impact | Glass transition temperature (° C.) | | | Peak | Proportion of particles having a particle |
| Preparation Example No. | strength modifier | derived from A1 component | derived from A2 component | Distribution state | position (μm) | size ranging from 0.05 to 0.4 μm (% by weight) |
| 15 | (15) | −55 | −28 | Double distribution | 0.20 0.10 | >90 |

TABLE 7

| | Thermoplastic resin incorporated and parts | | | | | | | Impact strength modifier incorporated and parts | | |
| --- | --- | --- | --- | --- | --- | --- | --- | --- | --- | --- |
| Example No. | PC | PBT | ABS | SAN | PPE | HIPS | PPS | (2) | (5) | (15) |
| 11 | 35 | 50 | — | — | — | — | — | 15 | — | — |
| 12 | 97 | — | — | — | — | — | — | 3 | — | — |
| 13 | — | — | — | — | 40 | 60 | — | — | — | 3 |
| 14 | 74 | — | 10 | 13 | — | — | — | 3 | — | — |
| 15 | — | — | — | — | — | — | 95 | — | 15 | — | resistance and also satisfactorily maintains the weathering resistance such as fade resistance or impact resistance. This impact strength modifier is suited for incorporation into a thermoplastic resin, particularly a vinyl chloride resin.

What is claimed is:

1. An impact strength modifier comprising, as a principal component, an acrylic rubber graft copolymer which is obtained by graft polymerization of a polyalkyl (meth) acrylate rubber (A) with one or more vinyl monomers (B), said polyalkyl (meth)acrylate rubber (A) comprising, as a principal component, an acrylic rubber (A1) component containing at least one of (a) a (meth)acrylate of an alcohol having a branched side chain,(b) a (meth) acrylate of an alcohol having an alkyl group with 13 or more carbon atoms, and (c) a (meth)acrylate having a hydroxyl group, a methoxy group or an ethoxy group as a constituent component, and an acrylic rubber (A2) component containing n-butyl acrylate as a constituent component, wherein acrylic rubber (A1) is different from acrylic rubber (A2), and wherein said acrylic rubber graft copolymer is obtained by graft polymerization of said polyalkyl (meth) acrylate rubber (A), which is obtained by polymerizing a monomer containing n-butyl acrylate constituting said acrylic rubber (A2) component in the presence of said acrylic rubber (A1) component obtained by emulsion polymerization, and one or more vinyl monomers (B), wherein the number distribution of the particle size of said polyalkyl (meth)acrylate rubber (A) is a distribution having at least two peaks within a range from 0.05 to 0.4 μm and not less than 70% by weight of said polyalkyl (meth)acrylate rubber (A) consists of particles having a particle size within a range from 0.05 to 0.4 μm.

2. An impact strength modifier according to claim 1, wherein said polyalkyl (meth)acrylate rubber (A) has two or more glass transition temperatures at 10° C. or lower.

3. An impact strength modifier according to claim 1, wherein a glass transition temperature (Tg1) derived from said acrylic rubber (A1) component is lower than a glass transition temperature (Tg2) derived from said acrylic rubber (A2) component.

4. An impact strength modifier according to claim 1, wherein said polyalkyl (meth) acrylate rubber (A) comprises said acrylic rubber (A1) component containing at least one of 2-ethylhexyl acrylate, ethoxyethyl acrylate, methoxypropylene glycol acrylate, 4-hydroxybutyl acrylate, tridecyl methacrylate and stearyl methacrylate as a constituent component and said acrylic rubber (A2) component containing n-butyl acrylate as a constituent component, and wherein a glass transition temperature (Tg1) derived from said acrylic rubber (A1) component is lower than a glass transition temperature (Tg2) derived from said acrylic rubber (A2) component.

5. An impact strength modifier according to claim 1, wherein said polyalkyl (meth)acrylate rubber (A) comprises said acrylic rubber (A1) component containing at least one of 2-ethylhexyl acrylate, tridecyl methacrylate and stearyl methacrylate as a constituent component and said acrylic rubber (A2) component containing n-butyl acrylate as a constituent component.

6. An impact strength modifier according to claim 1, wherein said polyalkyl (meth) acrylate rubber (A) contains 5-95% by weight of said acrylic rubber (A1) component and 95-5% by weight of said acrylic rubber (A2) component.

7. An impact strength modifier according to claim 1, wherein said polyalkyl (meth)acrylate rubber (A) contains a monomer having two or more unsaturated bonds per molecule in an amount of 20% by weight or less.

8. An impact strength modifier according to claim 1, wherein said acrylic rubber (A1) component and said acrylic rubber (A2) component respectively contain a monomer having two or more unsaturated bonds in a molecule in an amount within a range from of 0.1 to 20% by weight.

9. An impact strength modifier according to claim 1, wherein said acrylic rubber graft copolymer comprises 5–95% by weight of said polyalkyl (meth)acrylate rubber (A) and 95–5% by weight of said vinyl monomer (B).

10. An impact strength modifier according to claim 1, wherein said acrylic rubber graft copolymer comprises 50–95% by weight of said polyalkyl (meth)acrylate rubber (A) and 50–5% by weight of said vinyl monomer (B).

11. An impact strength modifier according to claim 1, wherein said acrylic rubber graft copolymer comprises 80–95% by weight of said polyalkyl (meth)acrylate rubber (A) and 20–5% by weight of said vinyl monomer (B).

12. An impact strength modifier according to claim 1, wherein said acrylic rubber graft copolymer comprises 82–95% by weight of said polyalkyl (meth)acrylate rubber (A) and 18–5% by weight of said vinyl monomer (B).

13. An impact strength modifier according to claim 1, wherein said acrylic rubber graft copolymer is obtained by graft polymerization of said polyalkyl (meth)acrylate (A) rubber, which is obtained by polymerizing a monomer containing n-butyl acrylate constituting said acrylic rubber (A2) component in the presence of said acrylic rubber (A1) component obtained by homogenized polymerization, and one or more vinyl monomers (B).

14. A method of preparing the impact strength modifier of claim 1, which comprises subjecting a monomer containing n-butyl acrylate constituting an acrylic rubber (A2) component to emulsion polymerization in the presence of an acrylic rubber (A1) component to obtain a polyalkyl (meth) acrylate (A) rubber (A).

15. A method of preparing the impact strength modifier according to claim 14, wherein said acrylic rubber (A1) component is obtained by a homogenized polymerization method.

16. A thermoplastic resin composition comprising the impact strength modifier of claim 1 and a thermoplastic resin.

17. A vinyl chloride resin composition comprising the impact strength modifier of claim 1 and a rigid vinyl chloride resin.

18. An impact strength modifier according to claim 1,
wherein acrylic rubber (A1) component consists essentially of said at least one of (a) a (meth)acrylate of an alcohol having a branched side chain, (b) a (meth) acrylate of an alcohol having an alkyl group with 13 or more carbon atoms, and (c) a (meth)acrylate having a hydroxyl group, a methoxy group or an ethoxy group as a constituent component, and optionally a monomer which is a crosslinking agent or graft cross agent,
and wherein acrylic rubber (A2) component consists essentially of n-butyl acrylate as a constituent component, and optionally a monomer which is a crosslinking agent or graft cross agent,
and wherein acrylic rubber (A1) is different from acrylic rubber (A2).

19. An impact strength modifier according to claim 1, wherein said one or more vinyl monomers (B) includes methyl methacrylate.

20. An impact strength modifier comprising, as a principal component, an acrylic rubber graft copolymer which is obtained by graft polymerization of a polyalkyl (meth) acrylate rubber (A) with one or more vinyl monomers (B), said polyalkyl (meth)acrylate rubber (A) comprising, as a principal component, an acrylic rubber (A1) component containing at least one of (a) a (meth)acrylate of an alcohol having a branched side chain and (b) a (meth) acrylate of an alcohol having an alkyl group with 13 or more carbon atoms as a constituent components and an acrylic rubber (A2) component containing n-butyl acrylate as a constituent component, wherein acrylic rubber (A1) is different from acrylic rubber (A2), and wherein said acrylic rubber graft copolymer is obtained by graft polymerization of said polyalkyl (meth) acrylate rubber (A), which is obtained by polymerizing a monomer containing n-butyl acrylate constituting said acrylic rubber (A2) component in the presence of said acrylic rubber (A1) component obtained by emulsion polymerization, and one or more vinyl monomers (B), wherein the number distribution of the particle size of said polyalkyl (meth)acrylate rubber (A) is a distribution having at least two peaks within a range from 0.05 to 0.4 µm and not less than 70% by weight of said polyalkyl (meth)acrylate rubber (A) consists of particles having a particle size within a range from 0.05 to 0.4 µm.

21. An impact strength modifier comprising, as a principal component, an acrylic rubber graft copolymer which is obtained by graft polymerization of a polyalkyl (meth) acrylate rubber (A) with one or more vinyl monomers (B), said polyalkyl (meth)acrylate rubber (A) comprising, as a principal component, an acrylic rubber (A1) component containing at least one of a (meth)acrylate of an alcohol having an alkyl group with 13 or more carbon atoms as a constituent component, and an acrylic rubber (A2) component containing n-butyl acrylate as a constituent component, and wherein acrylic rubber (A1) is different from acrylic rubber (A2), wherein the number distribution of the particle size of said polyalkyl (meth)acrylate rubber (A) is a distribution having at least two peaks within a range from 0.05 to 0.4 µm and not less than 70% by weight of said polyalkyl (meth)acrylate rubber (A) consists of particles having a particle size within a range from 0.05 to 0.4 µm.

22. An impact strength modifier comprising, as a principal component, an acrylic rubber graft copolymer which is obtained by graft polymerization of a polyalkyl (meth) acrylate rubber (A) with one or more vinyl monomers (B), said polyalkyl (meth)acrylate rubber (A) comprising, as a principal component, an acrylic rubber (A1) component containing at least one of a (meth)acrylate having a hydroxyl group, a methoxy group or an ethoxy group as a constituent component, and an acrylic rubber (A2) component containing n-butyl acrylate as a constituent component, and wherein acrylic rubber (A1) is different from acrylic rubber (A2), wherein the number distribution of the particle size of said polyalkyl (meth) acrylate rubber (A) is a distribution having at least two peaks within a range from 0.05 to 0.4 µm and not less than 70% by weight of said polyalkyl (meth)acrylate rubber (A) consists of particles having a particle size within a range from 0.05 to 0.4 µm.

* * * * *